UNITED STATES PATENT OFFICE.

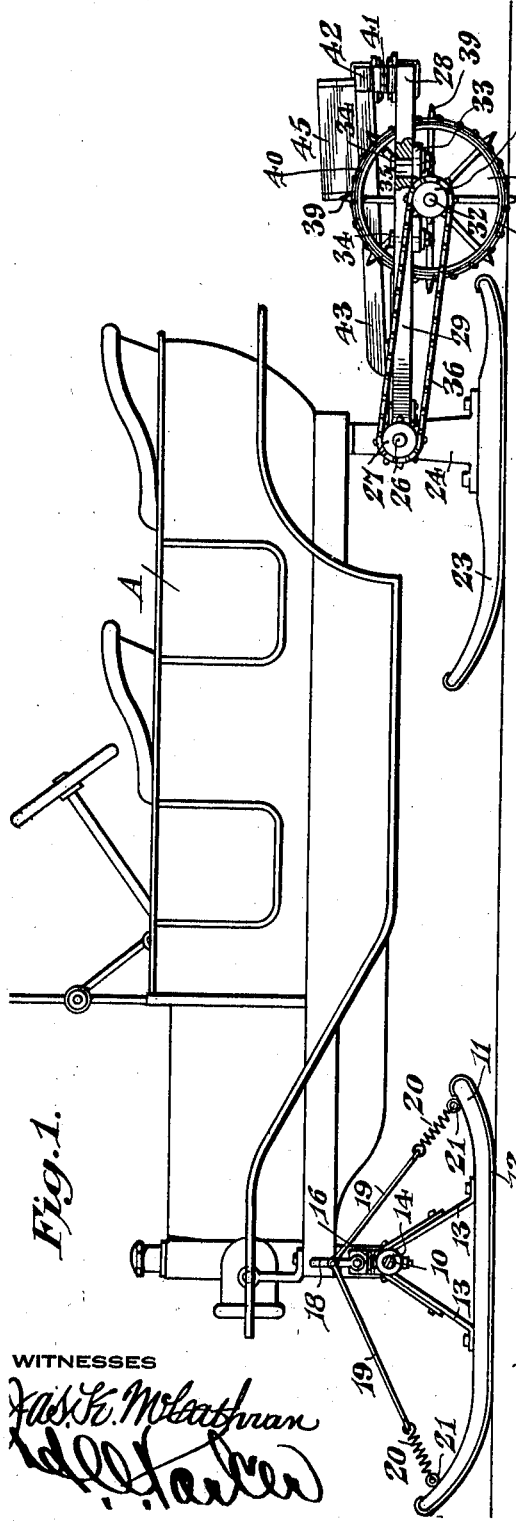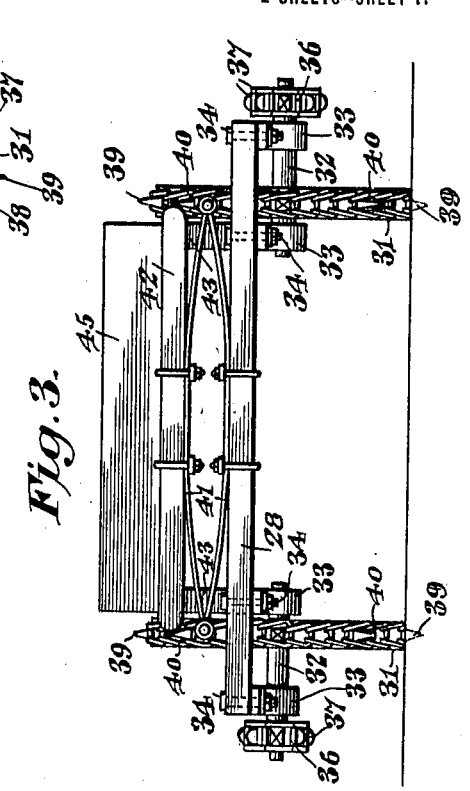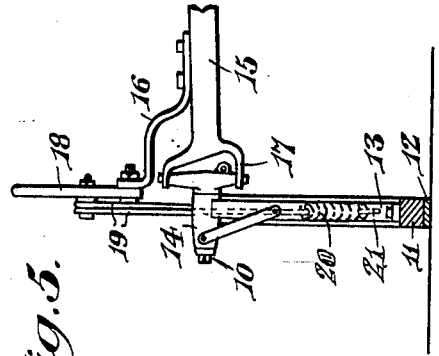

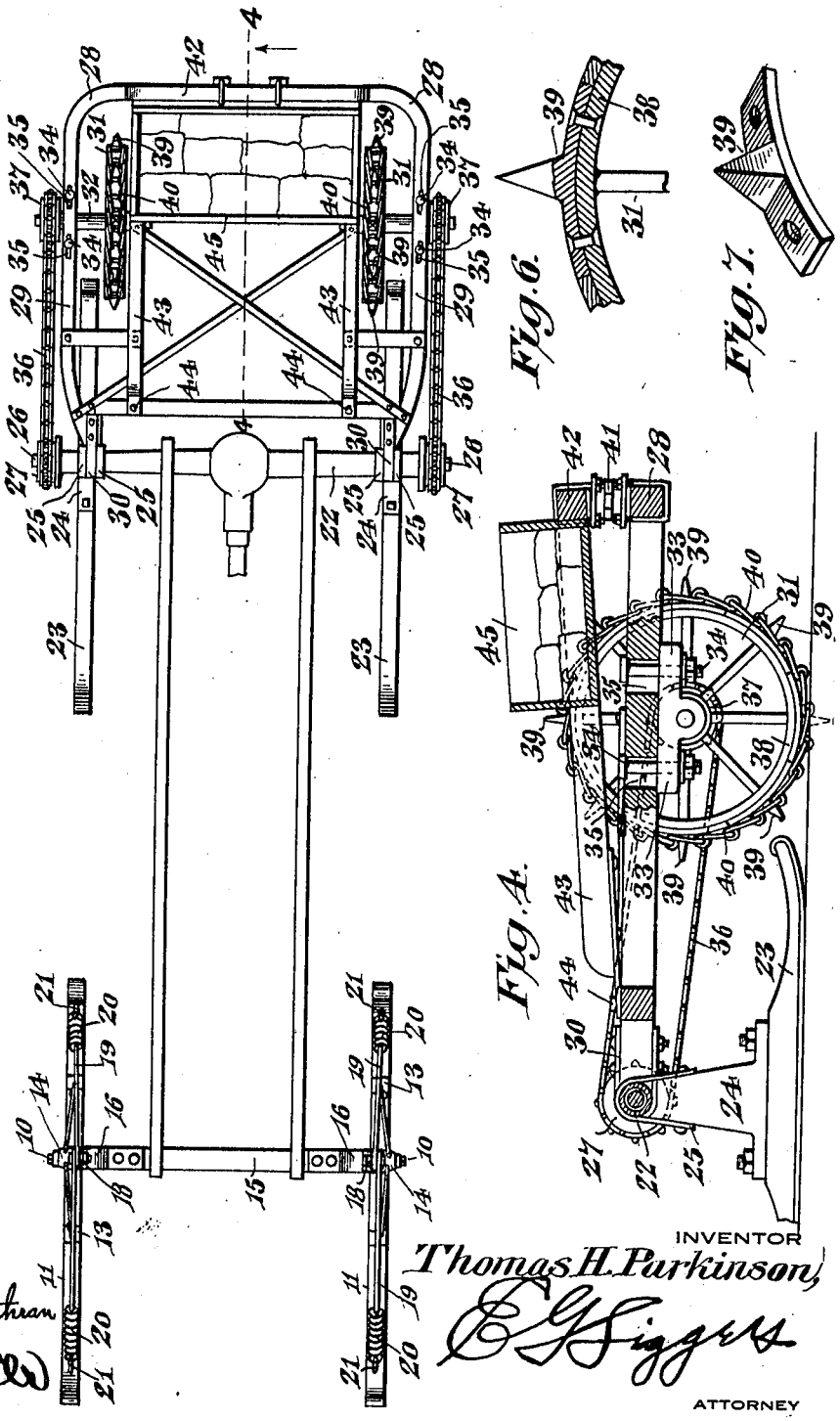
T. H. PARKINSON.
MOTOR DRIVEN SLEIGH.
APPLICATION FILED OCT. 23, 1917.
1,314,896.
Patented Sept. 2, 1919.
2 SHEETS—SHEET 2.
INVENTOR
Thomas H. Parkinson
WITNESSES
ATTORNEY

THOMAS H. PARKINSON, OF TWISP, WASHINGTON.

MOTOR-DRIVEN SLEIGH.

1,314,896. Specification of Letters Patent. Patented Sept. 2, 1919.

Application filed October 23, 1917. Serial No. 198,122.

*To all whom it may concern:*

Be it known that I, THOMAS H. PARKINSON, a citizen of the United States, residing at Twisp, in the county of Okanogan and State of Washington, have invented a new and useful Motor-Driven Sleigh, of which the following is a specification.

The invention relates to an attachment for automobiles, and more particularly to the class of motor-driven sleigh attachments for automobiles.

The primary object of the invention is the provision of an attachment of this character, wherein the automobile is converted into a sleigh, and driven in a unique and positive manner so that the same will travel over ice or snow surfaces and the driving wheels will be maintained in engagement with said surfaces, irrespective of the irregularities of the same.

Another object of the invention is the provision of an attachment of this character wherein the driving wheels thereof are prevented from clogging, thereby assuring a firm engagement with the ice or snow surfaces to avoid the slipping or the skidding of the wheels when driving an automobile.

A further object of the invention is the provision of an attachment of this character which is comparatively simple in construction, readily and easily applied to an automobile, without necessitating changes or alterations therein, strong, durable and inexpensive to manufacture and install.

A full and complete understanding of the invention may be obtained from a consideration of the following detailed description, taken in connection with the accompanying drawings forming a part of this specification, it being understood, of course, that while the drawings show a practical form of the invention, the latter is not confined to strict conformity therewith, but may be changed or modified, as long as such changes and modifications mark no material departure from the salient features of the invention, as specifically pointed out in the appended claims.

In the accompanying drawings:

Figure 1 is a side elevation of an automobile, showing the attachment constructed in accordance with the invention applied;

Fig. 2 is a top plan view of the chassis of the automobile showing in detail the sleigh attachment;

Fig. 3 is a rear elevation of a portion of the attachment;

Fig. 4 is an enlarged sectional view on the line 4—4 of Fig. 2, looking in the direction of the arrow and showing portions of the parts broken away;

Fig. 5 is a fragmentary vertical transverse sectional view through the front runner connected with the axle spindle of the automobile;

Fig. 6 is an enlarged fragmentary vertical sectional view through one of the driving wheels;

Fig. 7 is a perspective view of one of the tread cleats or spikes for the wheels.

Similar reference characters indicate corresponding parts throughout the several views in the drawings.

Referring to the drawings in detail, A designates generally an automobile structure of the ordinary type having the usual steering mechanism, not shown, for the guiding of the automobile in its travel.

Mounted upon the front axle spindles 10 of the automobile A are the front sleigh runners, each including the bob runner rail 11 carrying a tread shoe 12, the rail 11 being curved upwardly at its toe and heel, braces 13 and a hub 14, the braces being disposed in downwardly diverging relation to each other and are suitably fixed to the runner rail 11 and the hub 14 respectively. Fixed to the stationary axle 15 near each end thereof is a bracket 16 which extends over the usual turn-knuckle 17 connecting the axle spindle 10 to the stationary axle 15, and pivoted to this bracket 16 is a lever 18 to which are loosely connected forwardly and rearwardly extending rigid rods 19, the same being also connected to coiled retractile springs 20 which are connected to the eyebolts 21 mounted in the runner rails 11 near the toes and heels thereof. The lever 18 will swing on its pivot axis when each front runner is in deep snow and traveling over irregularities in the snow bed, and in this manner the runner will be prevented from turning over, because the springs 20 will act as equalizers to sustain the runner normally in neutral position or will return the same to such position when turned on the axle 10 in the travel of the automobile. It is, of course, understood that the front wheels of the automobile are removed when attaching the front runners.

The rear wheels of the automobile are removed and to the load-carrying axle 22 are fixed the rear runners, each consisting of a bob runner rail 23, the toe and heel ends of which are upwardly curved, and a standard 24 which is bolted or otherwise fastened to the runner rail 23 and clipped to said axle 22, preferably by the use of a pair of spaced straps 25, which embrace said axle 22 and are secured to the standard in any suitable manner. Fixed in any suitable manner to the respective ends of the driving axle 26 are sprocket wheels or hubs 27 for a purpose presently described.

Swingingly connected to the load-carrying axle 22 and extending rearwardly therefrom is a substantially U-shaped frame 28, which, at the forward ends of the sides 29 thereof, carry coupling straps 30 which loosely embrace the axle 22 between the straps 25 connecting the standards of the rear runners to said axle, and in this manner the frame 28 is attached to the said load-carrying axle 22 for vertical swinging movement. Arranged within the frame 28 is a pair of driving wheels 31 fixed to stud axles 32 which are journaled in bearings 33 arranged at the inner and outer sides of the wheels 31, each bearing being fitted with bolts 34 which are adjustably engaged in elongated slots 35 formed longitudinally in the frame 28, and in this manner the bearings 33 can be adjusted toward and away from the load-carrying axle 32 of the automobile for the loosening or tightening of endless driving chains 36 which are trained over the sprocket wheels or hubs 27 and also trained over sprocket wheels 37 fixed to the outer ends of the stud axles 32 which project beyond the sides 29 of the frame.

On the starting of the motor within the automobile motion will be imparted through the driving axle 26 to the chains 36, and thence to the wheels 31 for the advancement of the automobile upon its runners over a snow or ice surface.

The wheels 31 each has bolted or otherwise secured to the rim or felly 38 thereof cleats or spikes 39 which constitute non-skidding devices to assure the positive engagement of the wheels 31 with a snow or ice surface.

Surrounding each wheel 31 is a link chain 40, certain of the links of which are engaged with the cleats or spikes 39 so that displacement of the chains 40 circumferentially of the wheel is avoided, and these chains prevent the clogging of the wheel with snow or ice when traveling over a snow or ice surface by a limited movement lengthwise of the spikes.

Clamped or otherwise fastened to the rear cross rail of the frame 28 is an elliptical leaf spring 41 which yieldably supports the rear end of an auxiliary frame 42 superposed above the main frame 28, and has its side rails 43 at their forward ends fastened at 44 to the front cross beam of the main frame 28 to permit vertical swinging movements of the auxiliary frame 42, which supports a box or receiver 45 adapted to contain stones, rock, gravel or sand, constituting a weight for causing the driving wheels 31 to constantly engage with the snow or ice surface irrespective of irregularities in the surface, thus assuring the positive driving of the automobile thereover.

The operation of the automobile sleigh attachment, it is thought, will be apparent and as may be briefly expressed, will consist in driving the automobile over a snow or ice surface by power delivered from the engine or motor through the driving axle 26 to the chains 36, and thence to the wheels 31 so that the automobile is propelled for the advancement of the same upon the ice or snow surface.

From the foregoing, it is thought that the construction and operation of the invention will be clearly apparent, and therefore a more extended explanation has been omitted.

What is claimed is:

1. The combination with a motor vehicle having sleigh runners and also having a load-carrying and live axle, of a substantially U-shaped frame arranged rearwardly of the vehicle, means connecting the forward end of the frame to the load-carrying axle, bearings mounted on the frame, traction wheels having journals in said bearings and also provided with anti-skidding treads, sprocket wheels fixed to the journals of said wheels and also fixed to the live axle, endless sprocket chains trained over the sprocket wheels, and a weight carrier supported upon said frame.

2. The combination with a motor vehicle having sleigh runners and also having a load-carrying and live axle, of a substantially U-shaped frame arranged rearwardly of the vehicle, means connecting the forward end of the frame to the load-carrying axle, bearings mounted on the frame, traction wheels having journals in said bearings, sprocket wheels fixed to the journals of said wheels, sprocket wheels fixed to the live axle, endless sprocket chains trained over the sprocket wheels, a weight carrier supported upon said frame, and a spring interposed between the weight carrier and the frame for resiliently supporting said weight carrier.

3. The combination with a motor vehicle having sleigh runners and also having a load-carrying and live axle, of a substantially U-shaped frame arranged rearwardly of the vehicle, means connecting the forward end of the frame to the load-carrying axle, bearings mounted on the frame, traction wheels having journals in said bearings, sprocket wheels fixed to the journals of said wheels, sprocket wheels fixed to the live axle, endless sprocket chains trained over the sprocket wheels, an auxiliary frame having its forward ends flexibly connected to the first-named frame, an elliptical spring interposed between the frames for yieldably supporting said auxiliary frame, and a weight receptacle supported by the auxiliary frame.

4. The combination with a motor vehicle having sleigh runners and also having a load-carrying and live axle, of a substantially U-shaped frame arranged rearwardly of the vehicle, means connecting the forward end of the frame to the load-carrying axle, bearings mounted on the frame, traction wheels having journals in said bearings and also provided with anti-skidding treads, driving connections between the journals of the wheels and the live axle, an auxiliary frame having its forward ends flexibly connected to the first-named frame, an elliptical spring interposed between the frames for yieldably supporting said auxiliary frame, and a weight receptacle supported by the auxiliary frame.

In testimony, that I claim the foregoing as my own, I have hereto affixed my signature in the presence of two witnesses.

THOMAS H. PARKINSON.

Witnesses:
  J. S. ALLEN,
  WM. G. HUGHES.

Copies of this patent may be obtained for five cents each, by addressing the "Commissioner of Patents, Washington, D. C."